June 24, 1930. B. N. PIERCE 1,766,684
FUEL FEEDING DEVICE FOR MOTOR VEHICLES
Filed Jan. 28, 1925 2 Sheets-Sheet 1
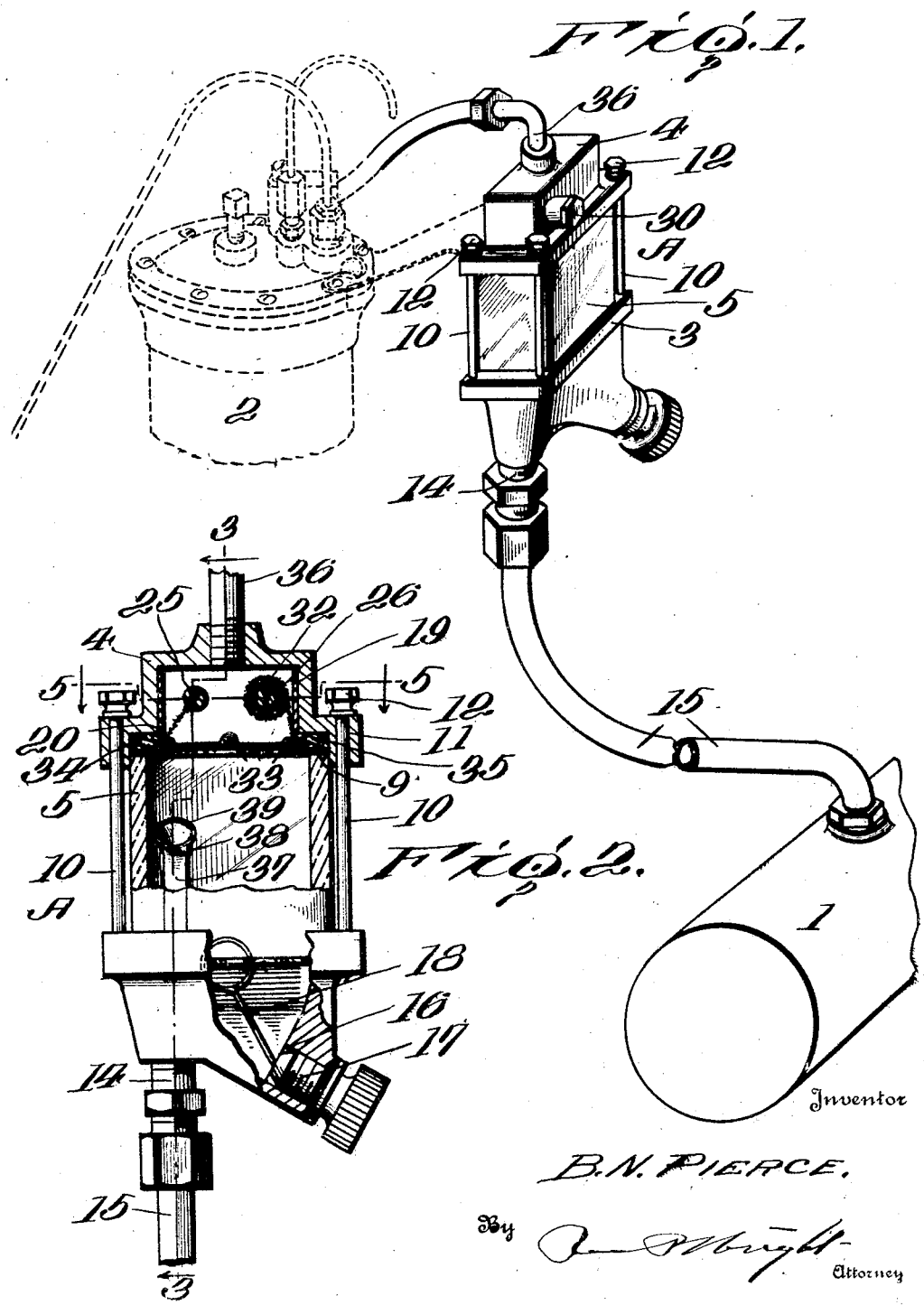

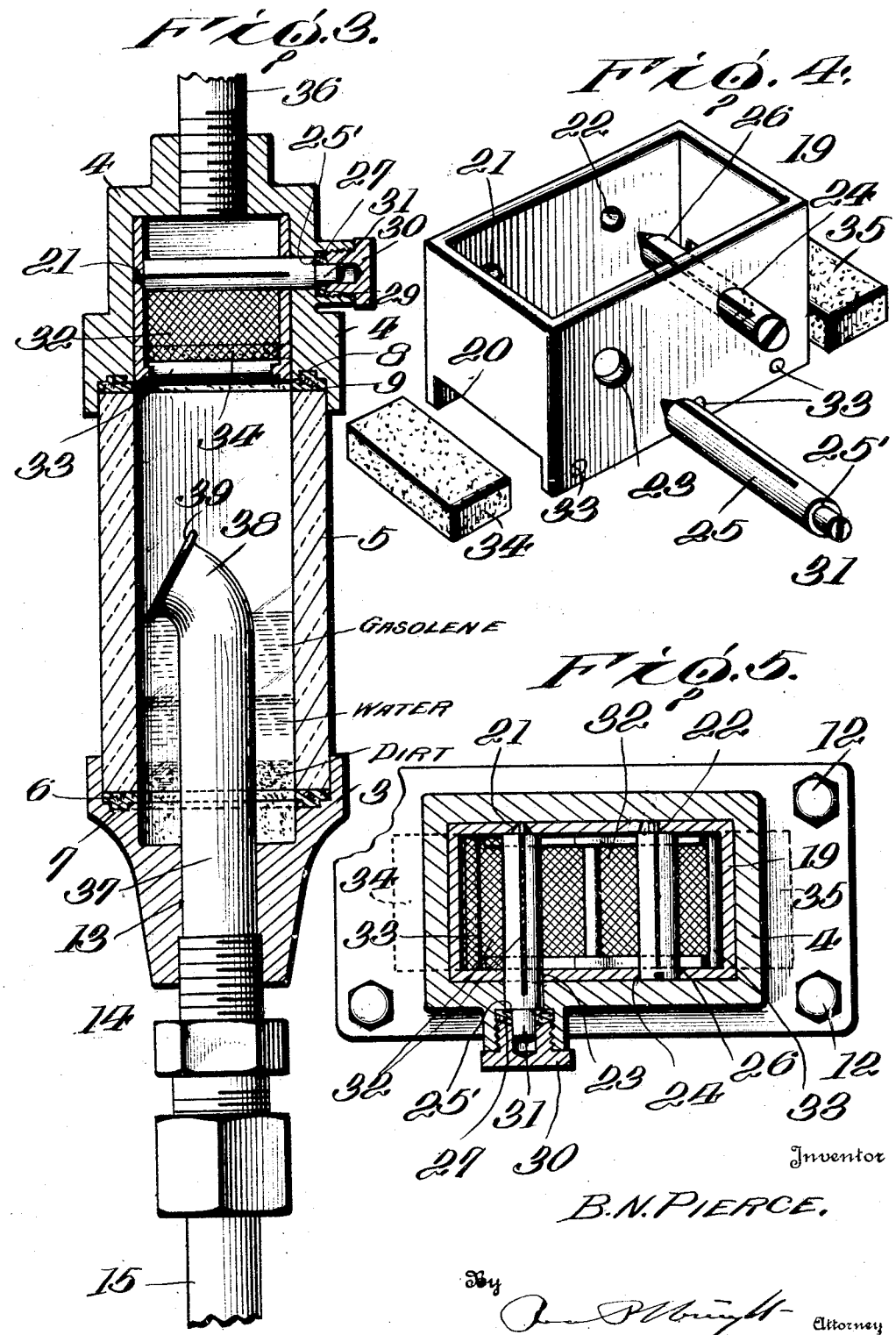

Patented June 24, 1930

1,766,684

UNITED STATES PATENT OFFICE

BURT NEULON PIERCE, OF NEW YORK, N. Y.

FUEL-FEEDING DEVICE FOR MOTOR VEHICLES

Application filed January 28, 1925. Serial No. 5,363.

This invention relates to certain new and useful improvements in vacuum fuel feed devices adapted to be used in connection with a vacuum fuel feed system and is an improvement on the construction of vacuum fuel feed apparatus disclosed in United States Letters Patent No. 1,366,760, dated January 25, 1921, issued to Benjamin F. Zimmerman, the object being to provide the device with a movable filtering medium whereby the filtering medium can be moved in order to bring the clean portion of the same in position to filter the gasoline in its passage therethrough, thereby overcoming the difficulties now existing in having to take the device apart to clean the filtering medium.

Another object of my invention is to improve the general construction of a device so that the gasoline, water and dirt are not agitated by the passage of the gasoline through the same in its passage from the main fuel supply tank to the vacuum tank in the vacuum fuel feed system.

Other and further objects and advantages of the invention will be hereinafter set forth and the novel features thereof defined by the appended claims.

In the drawings,

Figure 1 is a perspective view of my vacuum fuel feed device showing the same applied;

Figure 2 is a vertical longitudinal section through the device detached, partly in elevation;

Figure 3 is an enlarged transverse vertical section;

Figure 4 is a perspective view of the filtering medium supporting frame detached; and Figure 5 is a section taken on line 5—5 of Figure 2.

In the drawing 1 indicates the main fuel supply tank, 2 the vacuum tank and A my improved construction of vacuum feed device which is disposed in the fuel line between the main supply tank and the vacuum tank and is especially adapted to be used in connection with motor vehicles using the vacuum fuel fed system wherein the fuel is drawn from the main fuel supply tank to the vacuum and is fed from the vacuum tank to the carbureter by gravity, the above description being given so that the operation of my improved construction of vacuum fuel feed device can be readily understood when installed in the vacuum feed system as now employed on motor vehicles.

In carrying out my invention I employ a base member 3 and a head member 4 between which is disposed a rectangular glass tube 5 in order to allow the passage of the fuel through the device to be visible so as to indicate the proper working of the vacuum tank. The lower edge of the rectangular glass tube 5 is seated on a cork gasket 6 disposed on a horizontally disposed shoulder formed on the base 3 which is provided with a recess 7 into which the cork is pressed so as to form a tight joint. The head 4 is also provided with a shoulder having a recess 8 into which is adapted to be pressed a cork gasket 9 by the pressure of the upper edge of the glass tube 5. The base 3 carries standards 10 which pass through openings 11 formed in the head 4 which are provided with threaded ends on which are mounted cap nuts 12 so as to securely fasten the glass tube between the base and head. The base is provided with a vertical bore 13 which is threaded at its lower end into which is adapted to be placed a coupling nipple 14 to which a fuel line pipe 15 from the main fuel reservoir is adapted to be connected.

An internally threaded drain opening 16 is formed in the base which is closed by threaded plug 17 carrying a wire 18 having a ring formed on its end in order to prevent the plug from becoming lost, which allows the plug to be removed in order to drain the sediment and water out of the device as will be later described.

The head 4 is provided with a substantially rectangular chamber in which is disposed a box-like frame 19, the ends of which are cut away as shown at 20. One side wall of the box-like frame 19 is provided with tapering bearings 21 and 22 and the other side wall is provided with circular bearings 23 and 24 in which are adapted to be mounted shafts 25 and 26, the shafts being split and provided with pointed ends to fit within the bearings 21 and 22.

The shaft 25 is extended at one end and is adapted to extend into an internally threaded boss 27 formed on one side of the head and is provided with a shoulder 25' which is adapted to be engaged by a packing gland 29 forced in position by a plug 30, the extreme end of the shaft 25 being formed with a slot 31 in order to allow the shaft to be rotated by inserting a screw driver in the slot and turning the same.

The shaft 26 is also provided with a slot in its end to allow the same to be rotated.

A pervious strip of filtering material 32 is adapted to be threaded through the split shafts 25 and 26 so that when the shafts are in the position shown, the tapering ends will clamp the ends of the strip of filtering material in position, one end of the strip being wound upon the shaft 26 as clearly shown in Figure 2, said strip passing over pins 33 extending transversely through the sides of the box-like frame 19 so as to hold the strip of pervious filtering material in its proper position as it is wound from one shaft to the other. This provides means for moving the pervious filtering strip so as to place in position a new or clean surface when the filtering strip becomes clogged and while in the drawing I have shown a foraminous strip of wire gauze, it is, of course, understood that a strip of any suitable kind of material can be used as a filtering medium and therefore I do not wish to limit myself to the use of any particular kind of filtering medium for filtering the gasoline in its passage through the device.

The ends of the filtering strip are engaged by felts 34 and 35 seated in recesses formed in the head under the cork gaskets 9 so as to form a tight joint and to clean the filtering strip as it is wound from one shaft onto the other.

The head 4 is provided with a threaded bore in which is secured an outlet pipe 36 extending to the vacuum tank 2 in the usual manner and it will be seen that a filtering and visible device is placed in the fuel line between the main supply tank and the vacuum tank so that all the fuel passing to the vacuum tank is filtered so that the dirt and water in the gasoline is collected and can be readily removed through the drain opening 16.

While in the drawing I have shown a filtering means in the form of a strip carried by a pair of shafts disposed in a frame detachably mounted within the head of the device, I do not wish to limit myself to any particular manner of mounting a movable filtering medium as I am aware that various changes can be made in mounting the same as my invention consists broadly in providing a fuel feed device with a movably mounted filtering medium so that when the portion which is in use becomes clogged with dirt, a new portion can be brought in position to be used as a filtering medium.

Disposed within the bore 13 of the base 3 is a nozzle 37 which is bent at an acute angle as shown at 38 at its upper end, the extreme end being spread to form a bell 39 so that the fuel in its passage through the nozzle will be thrown upwardly against one of the side walls of the rectangular glass tube whereby the gas, water and dirt which normally remains at the level with the upper edge of the tube will not be agitated as the fuel is drawn through the device. In operation the fuel is discharged upwardly by the nozzle and passes through the filtering medium and when the vacuum tank becomes full, the fuel above the filtering medium passes back through the same so as to aid in cleaning the filtering medium.

The operation of my improved construction of vacuum fuel feeding device is substantially the same as that disclosed in the Zimmerman patent with the exception that by the improved construction of nozzle, the gasoline, water and dirt which are retained in the lower end of the glass tube, are not agitated on each suction stroke of the vacuum tank, whereby I am able to pass the gasoline through my device so as to clean the same and remove the water therefrom without agitating the gas, water and dirt which has already been collected, the particular construction of nozzle and manner of mounting the same forming the subject-matter of a companion application.

From the foregoing description it will be seen that I have provided a filtering and sight feed device for a vacuum fuel feed system wherein the device is provided with a movably mounted filtering medium so that when a portion of the same becomes clogged with dirt, a new portion can be brought into position to be used as a filtering medium and while I have shown a particular construction for obtaining this result, I do not wish to limit myself to any particular manner of mounting a movable filtering medium.

While I have shown and described my device used in connection with a vacuum fuel feeding system, I am fully aware that the same can be used in connection with any other of the well known fuel feeding systems used in connection with automobiles, such as a pump feeding fuel from the low level tank to the charge forming device and therefore I do not wish to limit myself to the use of the device in connection with any particular kind of fuel feeding system.

What I claim is:—

1. A device of the kind described having an inlet nozzle at its lower end and an outlet at its upper end, a movably mounted filtering medium mounted in the upper end of said receptacle below said outlet and felt strips arranged to engage said filtering medium.

2. A device of the kind described comprising a base member and a head member, a tube formed of glass disposed between said head member and base member, said head member being provided with an outlet and the base member with an inlet, a nozzle disposed in said base member for discharging fuel upwardly into said receptacle and a movably mounted filtering strip disposed in said head member.

3. A fuel filterer and indicator for fuel feeding systems comprising a receptacle having transparent side walls, said receptacle having a demountable head, a filtering medium detachably mounted in said head, said filtering medium comprising a strip of pervious material capable of being moved to expose a new surface as one portion thereof becomes clogged.

4. A device of the kind described comprising a receptacle adapted to be disposed in the fuel line pipe of a fuel feeding system having a detachable frame carrying a pair of shafts, said shafts having a strip of pervious material wound thereon and capable of being wound from one shaft to the other.

5. A device of the kind described comprising a receptacle adapted to be disposed in the fuel line pipe of a fuel feeding system, a detachable frame arranged in said receptacle having notched ends, one wall of said frame being provided with conical bearings and the other with circular bearings, split shafts having conical ends mounted in said bearings, a strip of pervious material having its ends secured in the split shafts and adapted to be wound thereon and felt strips arranged in the notched ends of said frame in engagement with said pervious strip.

6. A device of the kind described comprising a receptacle adapted to be disposed in the fuel line pipe of a fuel feeding system, a detachable frame arranged in said receptacle, shafts mounted in said frame, a strip of pervious material having its ends secured to said shafts and adapted to be wound thereon and through which the fuel is adapted to pass in passing through said receptacle and felt strips arranged in said frame in engagement with the pervious strip.

In testimony whereof I hereunto affix my signature.

BURT NEULON PIERCE.